Jan. 17, 1950          E. TELENIK          2,495,036
MACHINE FOR ASHING, ROUGING, AND POLISHING
ARTICLES MADE OF PLASTIC

Filed March 21, 1946          6 Sheets-Sheet 1

INVENTOR.
EUGENE TELENIK
BY
John P. Nixonor
ATTORNEY

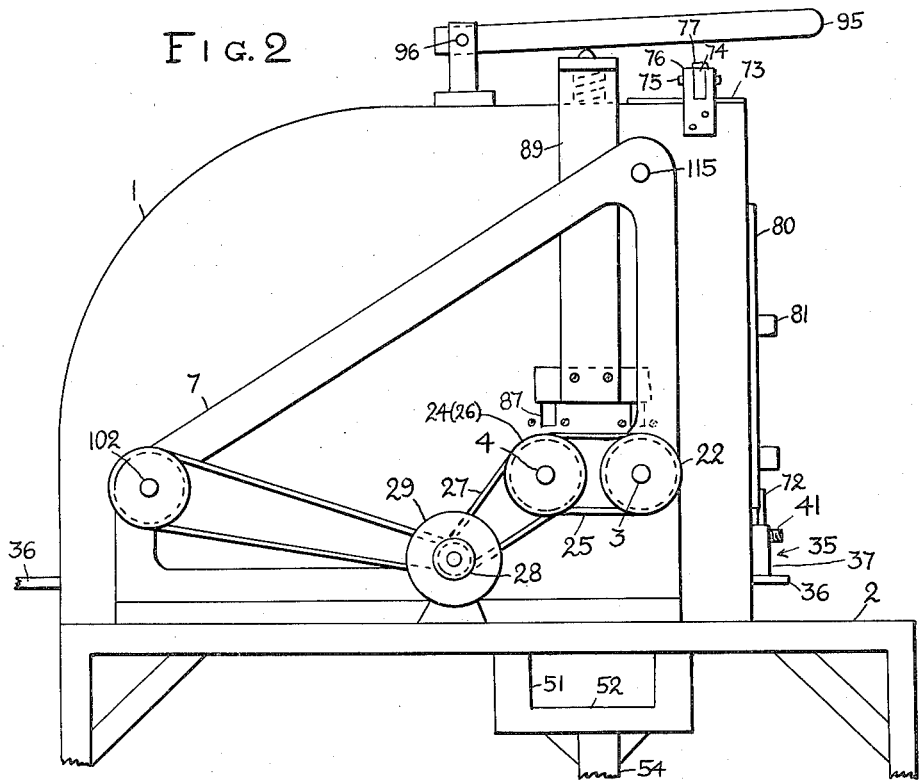
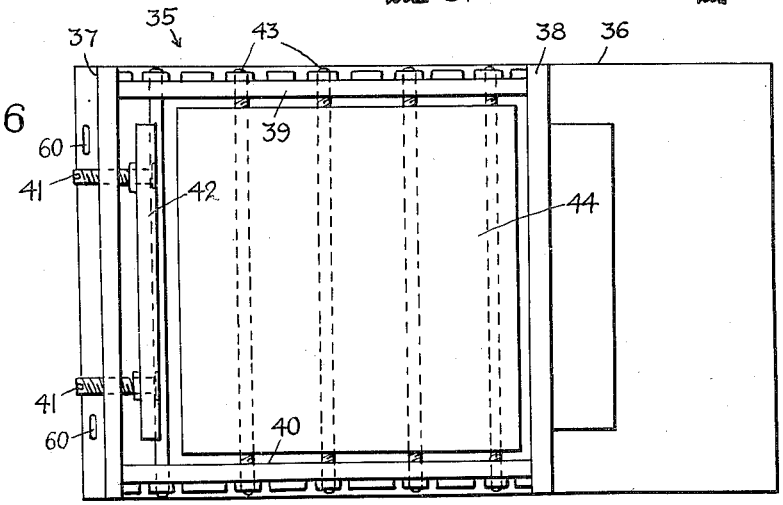

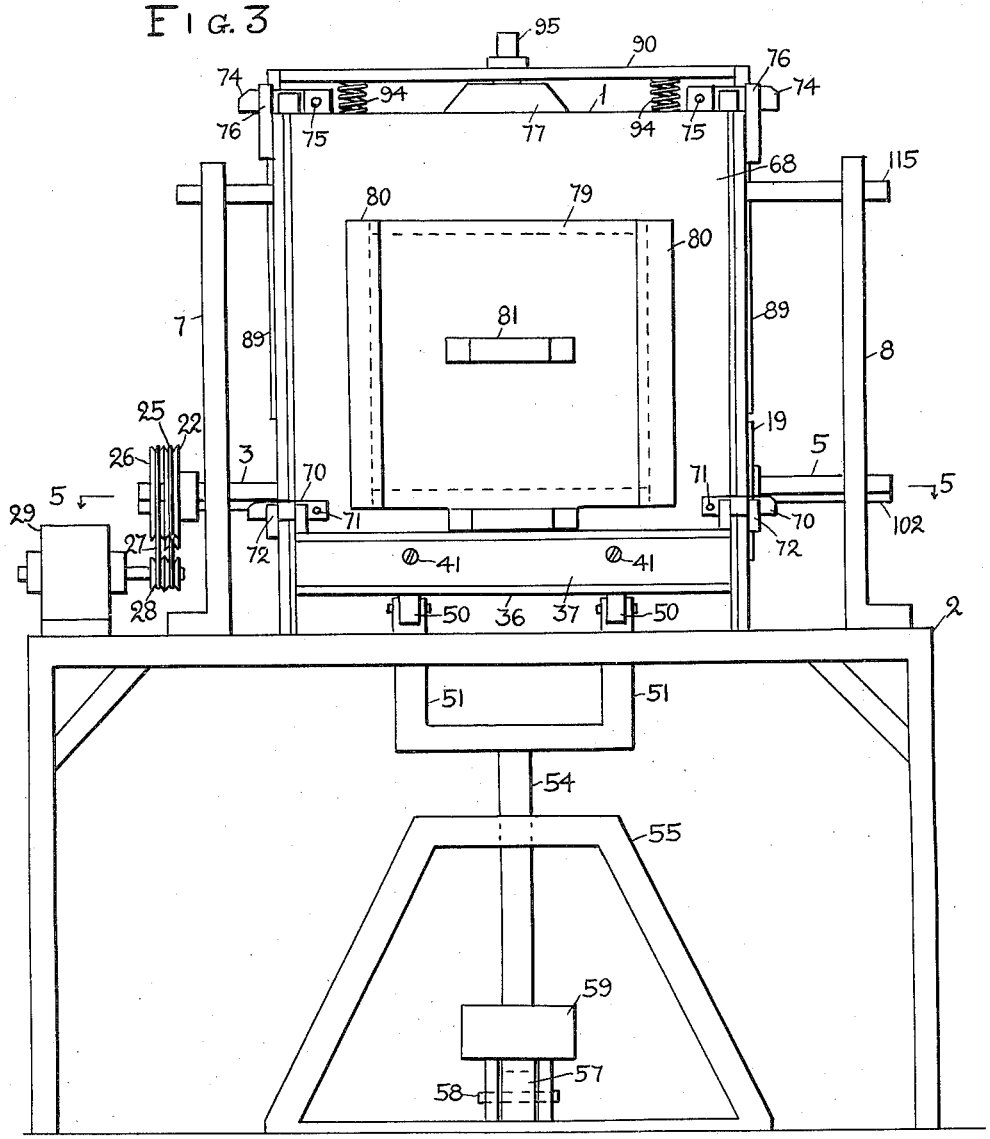

Jan. 17, 1950 E. TELENIK 2,495,036
MACHINE FOR ASHING, ROUGING, AND POLISHING
ARTICLES MADE OF PLASTIC
Filed March 21, 1946 6 Sheets-Sheet 4
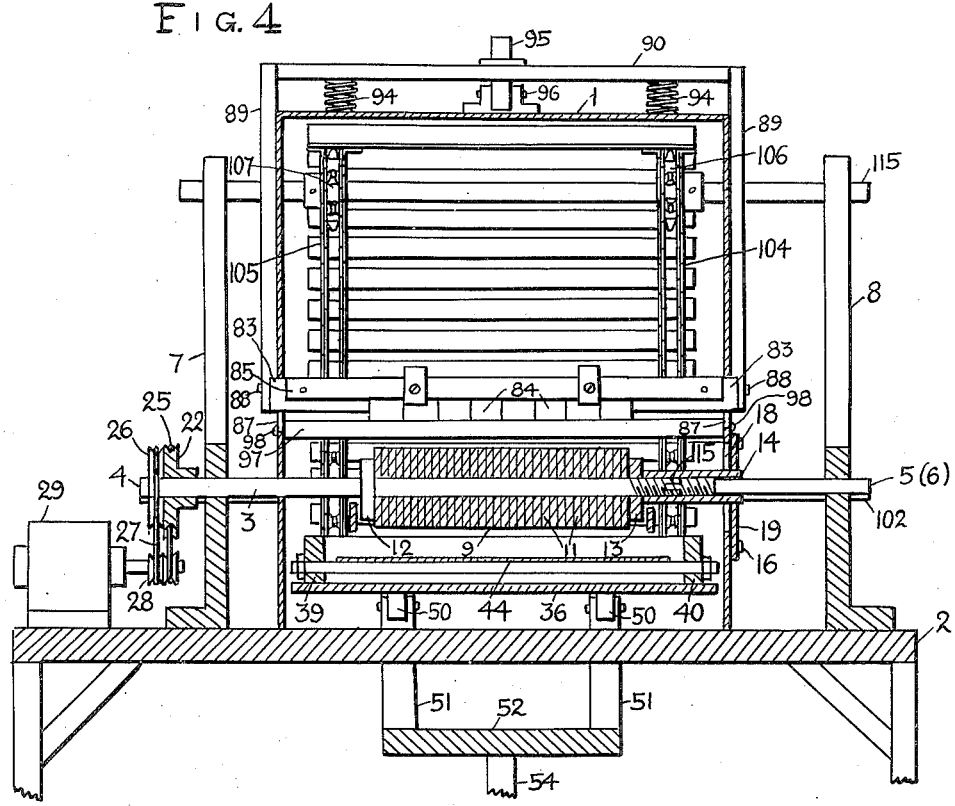
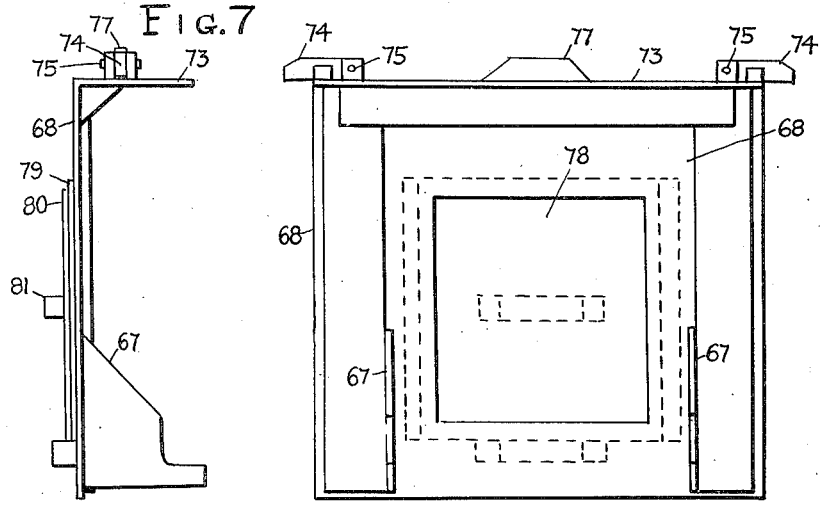
INVENTOR.
*Eugene Telenik*
BY
ATTORNEY

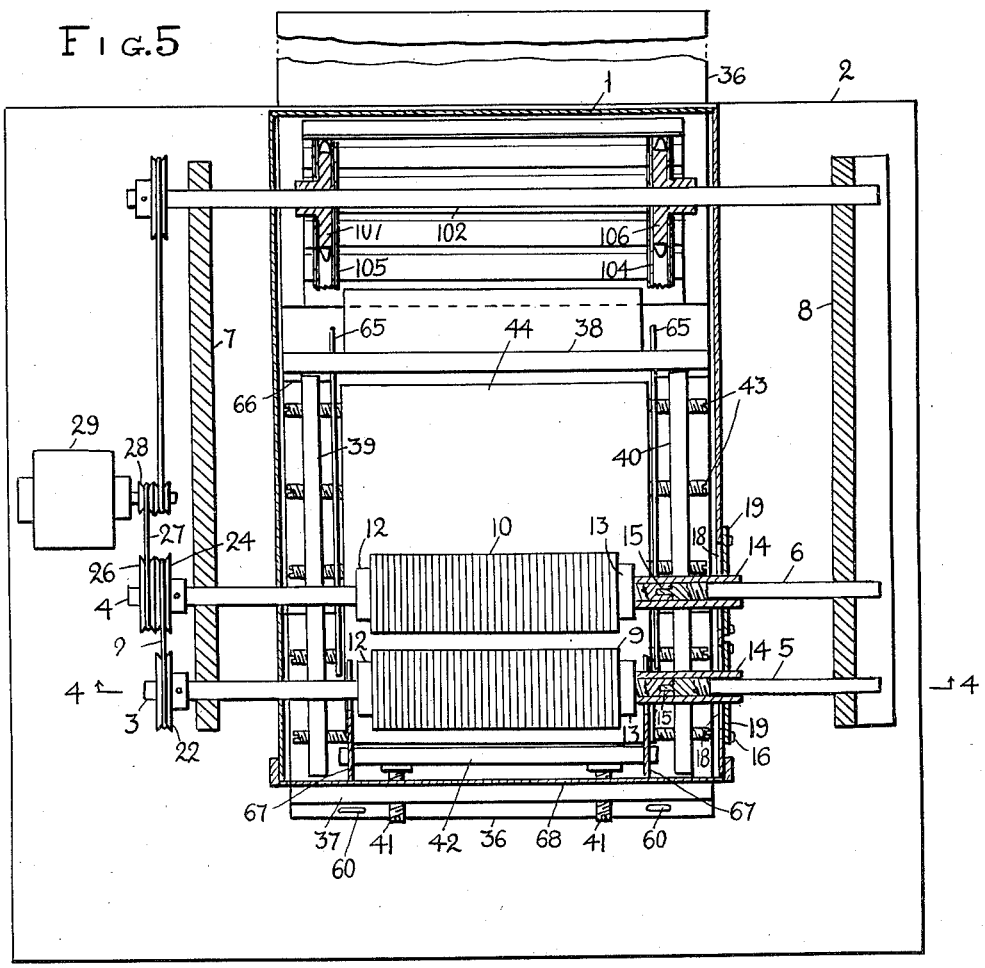

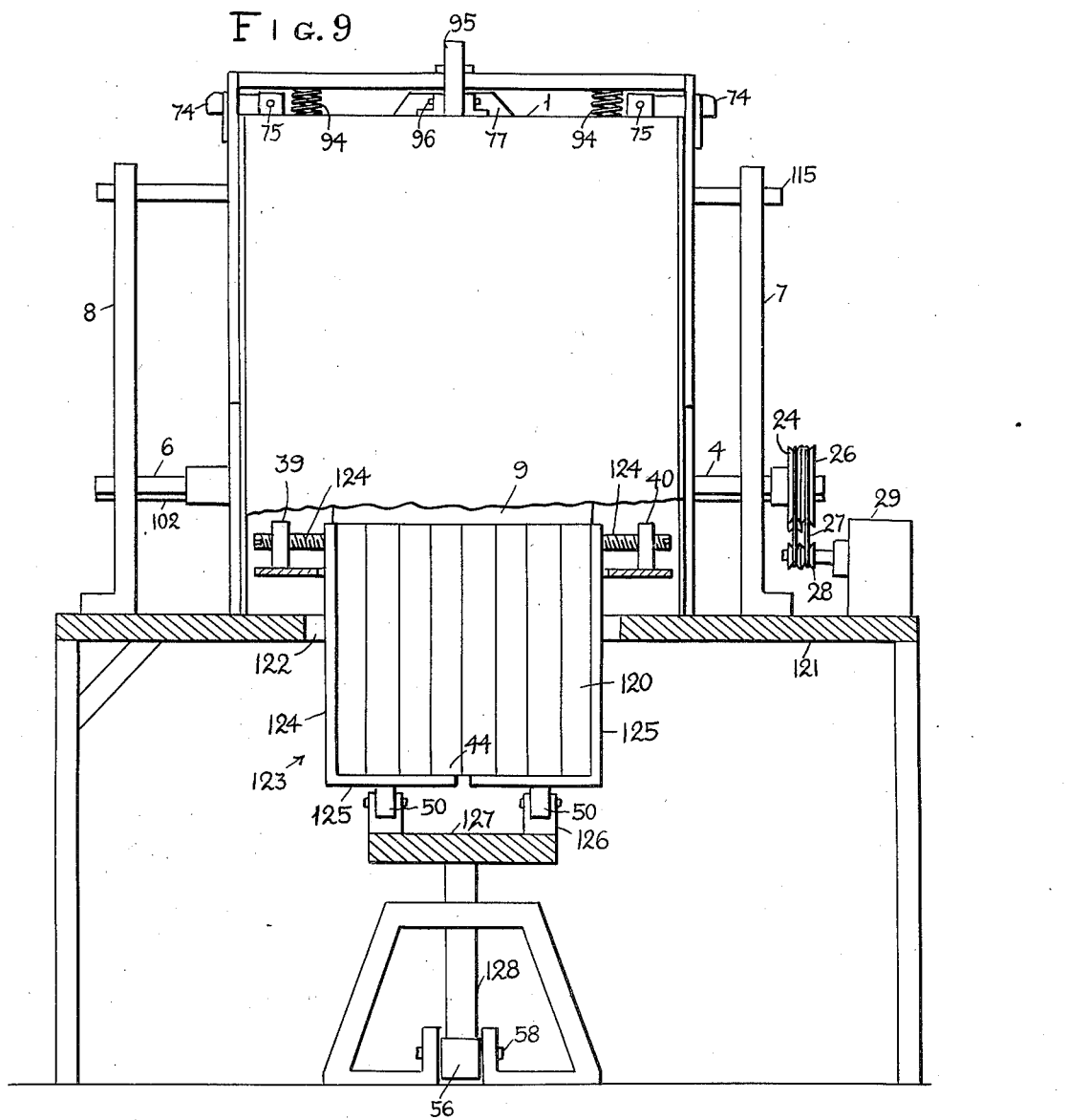

Patented Jan. 17, 1950

2,495,036

UNITED STATES PATENT OFFICE 2,495,036

MACHINE FOR ASHING, ROUGING, AND POLISHING ARTICLES MADE OF PLASTIC

Eugene Telenik, New York, N. Y.

Application March 21, 1946, Serial No. 656,055

10 Claims. (Cl. 51—92)

My invention relates to machines for preliminary or coarse polishing or grinding of articles made of a plastic composition.

My invention has for its object to provide a machine in which a relatively large number of similar articles made of a plastic composition as by machining, can be simultaneously subjected to a mechanical treatment for removing burrs, tool marks, etc., by rubbing with an abrasive composition, such as pumice or "rouge." Such polishing is usually required for articles made of "Lucite" and similar plastics.

Another object of my invention is to provide a machine of the foregoing general type in which the articles to be treated are entirely enclosed in a housing so that the abrasive composition can not escape to the outside, and in which the articles are, at the same time, fully exposed to view through a transparent window in the machine.

Another object of my invention is to provide a machine in which polishing rolls are assembled of a plurality of flexible discs compressed to a desired degree, and which discs can be easily replaced without dismantling the entire machine.

Another object of my invention is to provide a machine in which the same abrasive composition can be used over and over again, being collected from the bottom of the housing and automatically transferred to the surfaces being treated.

Another object of my invention is to provide a machine in which the pressure between the polishing rolls and the articles being treated can be continuously adjusted or regulated by using a conveniently arranged pedal, leaving the operator's hands free for controlling the machine.

Still another object of my invention is to provide means to rapidly and conveniently clamp the articles being treated into a suitable fixture in such a manner that upon completion of the operation on one side of the articles, the entire set of the articles can be reversed by a simple operation and clamped again in the reversed position for treating the other side of the articles.

Still another object of my invention is to provide means to movably support briquettes of a polishing material such as "rouge" above the rolls and to manually move the briquettes into a contact with the rolls for transferring some of the material on the surface of the rolls.

The foregoing and other objects, features and advantages of my invention are more fully explained in the following specification and accompanying drawing in which:

Fig. 2 is an elevational view of the other side of the machine;

Fig. 3 is an elevational front view of the same;

Fig. 4 is a sectional front elevational view of the same taken on the line 4—4 of Fig. 5;

Fig. 5 is a sectional plan view of the same taken on the line 5—5 of Fig. 3;

Fig. 6 is a plan detail view of the work-supporting jig;

Fig. 7 is a side view of the front cover of the machine;

Fig. 8 is a front view of the same;

Fig. 9 is a rear view of the machine with a modified work-supporting jig.

Figure 1:
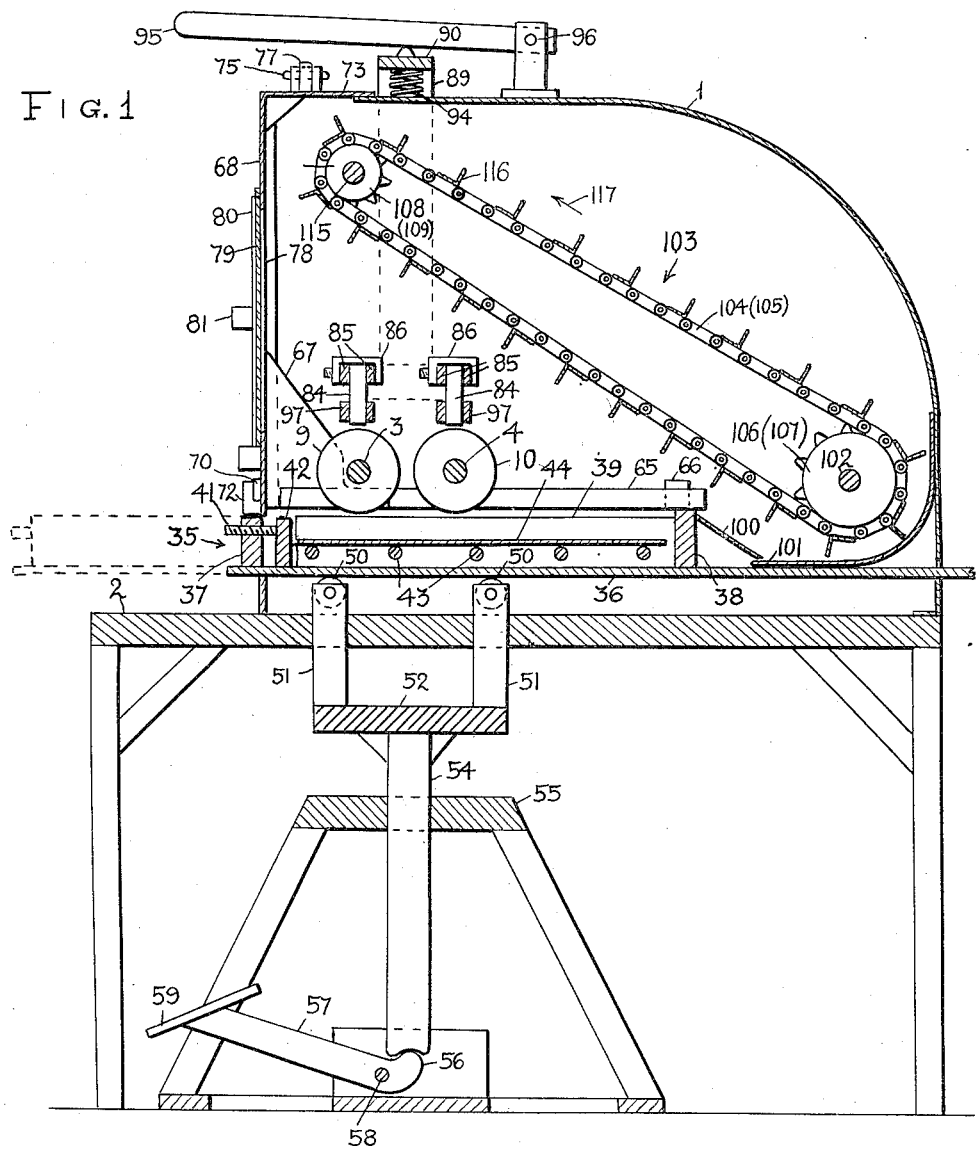
Fig. 1 is a sectional side view of the machine according to my invention.

My machine comprises a housing 1 open at the front and mounted on a table 2. Shafts 3, 4 with detachable extensions 5, 6 pass through the side walls of the housing and are journaled in bearing brackets 7, 8 also mounted on the table or base 2. The shafts mount polishing rolls 9, 10 consisting each of a plurality of polishing discs 11, preferably made of a coarse polishing fabric. The discs rest against collars 12 and are compressed in place by washers 13 engaged by sleeves 14 threaded on the extensions 5, 6 of the shafts 3, 4. The extensions 5, 6 have tongues 15 at the inner ends fitted in corresponding grooves or slots in the inner ends of the shafts 3, 4 so that the extensions rotate together with the main shafts. For replacing the polishing discs, the sleeves 14 are unscrewed until the tongue and groove connections are exposed, allowing the sleeves with the shaft extensions 5, 6 to be moved outwards. The discs can be then removed from the shafts through large openings 18 in the side wall of the housing 1. The openings 18 are normally closed by cover plates 19 attached by screws 16 and provided with central openings for the sleeves 14. Although two polishing rolls are shown, it should be understood, however, that a single roll may be used if desired, or more than two rolls.

The other ends of the shafts 3, 4 are provided with pulleys 22, 24 connected together by a belt 25. Shaft 4 also carries a pulley 26 connected by a belt 27 with a pulley 28 at the end of the shaft of an electric motor 29 mounted on the base 2.

The work which may consist of a plurality of pieces (not shown) made, for instance, by machining from a suitable plastic composition, is placed in a jig generally designated 35 and comprising a base plate 36 extending through a suitable slot in the rear wall of the housing 1 and also extending through the front opening of the housing. The plate 36 mounts end walls 37, 38 and movable side walls 39, 40. The front wall 37 is provided with clamping screws 41 threaded therein and engaging a clamping bar 42. The side walls are connected together by transversely extending screws 43 for drawing the walls 39, 40 toward each other so as to clamp the work therebetween. The work is also clamped longitudinally by tightening the screws 41 against the clamping bar 42. The work pieces are supported on a plate 44 lying on top of the side screws 43. Thus, upon completion of the polishing operation of the upper surfaces of the work pieces, the clamping screws can be released and the work pieces simultaneously removed by covering them with another similar plate (not shown) and turning the jig over whereby the work piece will rest on the new plate which is then inserted and clamped in the jig. The work pieces will be then exposed for polishing at the opposite sides. Thus the complete reversal and reclamping of the entire assembly of the work pieces can be effected quickly and accurately.

The base plate 36 of the jig is supported on rollers 50 mounted on posts 51 sliding in corresponding openings in the table 2 and extending from a board 52. The latter is mounted on a central post 54 slidably supported in a frame 55. The lower end of the post 54 rests on the inner leg 56 of a lever 57 pivotally supported at 58 and provided at the other end with a pedal 59.

The operator, by applying pressure on the pedal, can raise the supporting members 51, 52 and 54 thereby pressing the work clamped in the jig against the polishing rolls 9, 10, regulating the pressure to a desired degree. The operator at the same time can move the jig back and forth under the rolls so as to uniformly polish the work in the jig. The front end of the jig may be provided for this purpose with suitable handles or slots 60 in the front end of the plate 36. For coarse polishing operation, a suitable abrasive material is used such as pumice or similar substance. It is retained on the jig by side shields 65 supported on blocks 66 secured to the side walls of the housing. Similar shields 67 are provided at the front of the housing and are secured to the inner side of a front cover plate 68. The cover plate 68 is held against the front end of the housing by latches 70 pivoted at 71 to the plate 68 and engaging keepers or hooks 72 at the side walls of the housing. The upper end of the cover 68 is provided with a flange 73 extending over the opening at the top of the housing and attached by latches 74 pivoted at 75 and engaging hooks or keepers 76 at the side walls. A handle 77 may be provided on the flange 73. The cover may be made of a transparent material if desired to facilitate observation of the work and is provided with an opening 78 closed by a door 79 sliding between rails or guides 80, having a handle 81. The door can also be made of a transparent material. The opening 78 is used for charging an abrasive material on top of the work on the jig.

For a finer polishing of the work, a finer abrasive material is used, such as is known in trade as "rouge." It is supplied in the form of briquettes 84 and is applied to the rolls 9, 10 by rubbing the briquettes against the rolls. To facilitate this operation, the briquettes are held between bars 85 clamped together by screw clamps 86. The ends of the holding bars 85 are attached to end bars 83 extending through slots 87 in the side walls of the housing and are detachably fastened as by screws 88 to the ends of vertical bars 89 whose upper ends are secured to the ends of a cross bar 90. The latter rests on compression springs 94, urging the frame composed of parts 85, 89, and 90 upward so that the briquettes do not normally touch the rolls. The frame can be depressed by a manually operable lever 95 engaging the cross bar 90 and pivoted at 96. The briquettes are further guided in their vertical movement by guiding bars 97 secured by screws 98 to the side walls of the housing. The bars 97 can be removed for replacing the briquettes, the holding bars 85 being also removable.

The used abrasive material, which may be dry or wet, slides from the work over an inclined plate 100, attached to the rear wall 38 of the jig, into the rear portion of the housing 1, where a well is formed by a curved sheet 101 secured to the walls of the housing. The curvature of the sheet 101 is preferably concentric to a shaft 102 of a conveyor generally designated 103 and comprising two endless chains 104, 105, passing over sprockets 106, 107 on the shaft 102 and sprockets 108, 109 on an upper shaft 115. The shafts 102 and 115 pass through the side walls of the housing 1 and are journaled in the brackets 7, 8. The chains support scrapers or buckets 116 which remove the abrasive material accumulated in the rear portion of the housing or the curved sheet 101 and carry the material up and to the front of the machine in the direction of an arrow 117, the material then being dumped on the rolls and on the work.

It should be noted that the machine may be used for rough abrasive work only, without the attachment for the rouge blocks or briquettes, and a separate machine used for "rouging" only.

A modified jig construction is shown in Fig. 9, especially suitable for finishing ends of long articles 120. The table 121 is provided with a large opening 122 for a jig generally indicated 123 and comprising movable side walls 124, 125 clamped against the work pieces 120 by screws 124' threaded in the stationary walls 39, 40. The walls have bottom flanges 125 supporting the loose plate 44 and resting on the rollers 50. The latter are mounted on short posts 126 extending from a plate 127 supported on a central post 128 sliding in a frame 129. A pedal-operated lever 56 is provided for raising the plate 127 and the jig 123 toward the rolls 9, 10.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A machine for rough polishing of articles made of a plastic composition, comprising a housing; a jig for removably holding a plurality of articles to be treated by an abrasive material; means to slidably support the jig at the bottom of the housing; a polishing roll rotatively supported in the housing in a cooperative relation to the articles in the jig; a conveyor movably supported in the housing above the roll and extending to the bottom of the housing behind the roll; means to rotate the roll and to move the conveyor; buckets on the conveyor constructed to gather the used abrasive substance from the bottom of the housing and to convey the same to the roll for its reuse in treating the articles; a plunger slidably fitted in the bottom portion of the housing; means to support the jig on the plunger; and pedal means for raising the plunger thereby adjusting the pressure between the articles and the roll.

2. In a machine for polishing articles made of a plastic composition, a tray for the articles; side walls on the tray; means between the walls and the bottom of the tray for slidably supporting the walls; screws threaded into the walls extending across the tray for moving the walls, thereby clamping the articles together; and a plate for the articles removably supported on the screws; a stationary front wall; a movable front wall; and screws threaded into the stationary wall for moving the movable wall, thereby longitudinally clamping the articles.

3. A machine for rough polishing of articles made of a plastic composition, comprising a housing; a jig for removably holding a plurality of articles to be treated by an abrasive material; means to slidably support the jig at the bottom of the housing; a polishing roll rotatively supported in the housing in a cooperative relation to the articles in the jig; a conveyor movably supported in the housing above the roll and extending to the bottom of the housing behind the roll; means to rotate the roll and to move the conveyor; buckets on the conveyor constructed to gather the used abrasive substance from the bottom of the housing and to convey the same to the roll for its reuse in treating the articles, the housing having an opening at the front for the front portion of the jig, and a handle on said jig extending through said opening, the jig being adapted to be manually moved through the opening under the rolls for polishing the articles.

4. A machine for rough polishing of articles made of a plastic composition, comprising a housing; a jig for removably holding a plurality of articles to be treated by an abrasive material; means to slidably support the jig at the bottom of the housing; a base for the housing; means to support the jig at the bottom of the housing; bearings mounted on the base; a shaft journaled in the bearings at an elevation above the jig in the housing; a plurality of polishing discs assembled on the shaft; means on the shaft to tighten the discs, the walls of the housing having openings for the shaft, one opening being sufficiently large for replacing the discs on the shaft; a plate with an opening for the shaft covering the large opening in the wall and removably attached thereto; means to move the jig upward for bringing the articles into engagement with the discs; means to continuously supply an abrasive material to the discs and to the surfaces of the articles; and means to rotate the shaft with the discs.

5. A machine for rough polishing of articles made of a plastic composition, comprising a housing; a jig for removably holding a plurality of articles to be treated by an abrasive material; means to slidably support the jig at the bottom of the housing; a polishing roll rotatively supported in the housing in a cooperative relation to the articles in the jig; a conveyor movably supported in the housing above the roll and extending to the bottom of the housing behind the roll; means to rotate the roll and to move the conveyor; buckets on the conveyor constructed to gather the used abrasive substance from the bottom of the housing and to convey the same to the roll for its reuse in treating the articles; and low upstanding walls at the bottom of the housing under the conveyor for guiding the jig, the walls extending to the rear of the housing enclosing the rear portion of the conveyor.

6. A machine for rough polishing of articles made of a plastic composition, comprising a housing; a jig for removably holding a plurality of articles to be treated by an abrasive material; means to slidably support the jig at the bottom of the housing; a polishing roll rotatively supported in the housing in a cooperative relation to the articles in the jig; a conveyor movably supported in the housing above the roll and extending to the bottom of the housing behind the roll; means to rotate the roll and to move the conveyor; buckets on the conveyor constructed to gather the used abrasive substance from the bottom of the housing and to convey the same to the roll for its reuse in treating the articles; a fixture for supporting a plurality of briquettes of a polishing material; means to movably support the fixture above the roll in an axial alignment therewith; and means to manually move the fixture for causing the briquettes to engage the roll and to transfer the polishing material thereon.

7. A machine for rough polishing of articles made of a plastic composition, comprising a housing; a jig for removably holding a plurality of articles to be treated by an abrasive material; means to slidably support the jig at the bottom of the housing; a polishing roll rotatively supported in the housing in a cooperative relation to the articles in the jig; a conveyor movably supported in the housing above the roll and extending to the bottom of the housing behind the roll; means to rotate the roll and to move the conveyor; buckets on the conveyor constructed to gather the used abrasive substance from the bottom of the housing and to convey the same to the roll for its reuse in treating the articles; a fixture for supporting a plurality of briquettes of a polishing material; means to movably support the fixture above the roll in an axial alignment therewith; means to guide the fixture with the briquettes; bars extending upward from the ends of the fixture slidably supported on the walls of the housing; a member connecting the upper ends of the bars; springs urging the bars upward; and manual means to depress the bars thereby causing the briquettes to engage the roll and to apply the polishing material to the surface thereof.

8. A machine for rough polishing of articles made of a plastic composition, comprising a housing; a jig for removably holding a plurality of articles to be treated by an abrasive material; means to slidably support the jig at the bottom of the housing; a pair of polishing rolls rotatively supported in the housing; means to rotate the rolls; a pedal under the housing operatively connected to the jig supporting means for raising the jig supporting means thereby causing the articles to be engaged by the rolls; a front conveyor shaft rotatively supported in the housing above the rolls; a rear conveyor shaft rotatively supported in the housing below the rolls; sprockets on the shafts near the walls inside the housing; endless chains on the sprockets; buckets supported on the chains extending across the housing, constructed and arranged to gather the abrasive material from the bottom of the housing and to deliver the same to the rolls and articles; and means to rotate the conveyor shafts.

9. A machine for rough polishing of articles made of a plastic composition, comprising a housing; a jig for removably holding a plurality of articles to be treated by an abrasive material; means to slidably support the jig at the bottom of the housing; a base for the housing; means to support the jig at the bottom of the housing; bearings mounted on the base; a shaft including an attachable extension journalled in the bearings at an elevation above the jig in the housing; a plurality of polishing discs assembled on the shaft; means for interconnecting said shaft and extension and for tightening the discs on the shaft, the walls of the housing having openings for the shaft, one opening being sufficiently large for replacing the discs on the shaft; a plate with an opening for the shaft covering the large opening in the wall and removably attached thereto; means to move the jig upward for bringing the articles into engagement with the discs; means to continuously supply an abrasive material to the discs and to the surfaces of the articles; and means to rotate the shaft with the discs.

10. A machine for rough polishing of articles made of a plastic composition, comprising a housing; a jig for removably holding a plurality of articles to be treated by an abrasive material; means to slidably support the jig at the bottom of the housing; a base for the housing; means to support the jig at the bottom of the housing; bearings mounted on the base; a shaft having a transverse slot at one end; an extension shaft with a tongue at one end thereof, said ends of said shaft and extension shaft being threaded and adapted to be placed in abutting engagement with the tongue in mesh with the slot; a plurality of polishing discs assembled on the shaft; an internally threaded sleeve for interconnecting said shaft and extension shaft and for tightening said discs on the shaft; the walls of the housing having openings for the shaft, one opening being sufficiently large for replacing the discs on the shaft; a plate with an opening for the shaft covering the large opening in the wall and removably attached thereto; means to move the jig upward for bringing the articles into engagement with the discs; means to continuously supply an abrasive material to the discs and to the surfaces of the articles; and means to rotate the shaft with the discs.

EUGENE TELENIK.

REFERENCES CITED

The following references are of record in the file of this patent:

UNITED STATES PATENTS

| Number | Name | Date |
| --- | --- | --- |
| 132,898 | Colly | Nov. 12, 1872 |
| 487,763 | Norton | Dec. 13, 1892 |
| 540,998 | Morgan | June 11, 1895 |
| 616,184 | Demmler | Dec. 20, 1898 |
| 861,387 | Pierce | July 30, 1907 |
| 900,174 | Klingemberg | Oct. 6, 1908 |
| 901,909 | Johnston | Oct. 20, 1908 |
| 964,192 | Vanneman | July 12, 1910 |
| 1,047,571 | Sadler | Dec. 17, 1912 |
| 1,060,170 | Dilg | Apr. 29, 1913 |
| 1,212,564 | Rowe | Jan. 16, 1917 |
| 1,674,888 | Cleton | June 26, 1928 |
| 1,847,410 | Mulholland | Mar. 1, 1932 |
| 1,937,795 | Sheehan | Dec. 5, 1933 |
| 1,976,380 | Wilkinson | Oct. 9, 1934 |
| 2,104,055 | Peik | Jan. 4, 1938 |
| 2,305,451 | Turnbull | Dec. 15, 1942 |
| 2,394,610 | Hawkins | Feb. 12, 1946 |
| 2,410,955 | Torgerson | Nov. 12, 1946 |
| 2,424,835 | Luckey et al. | July 29, 1947 |

FOREIGN PATENTS

| Number | Country | Date |
| --- | --- | --- |
| 696,922 | France | Jan. 9, 1931 |